Oct. 18, 1949.
T. E. GANNON
2,485,092
VALVE CONSTRUCTION
Filed May 20, 1944
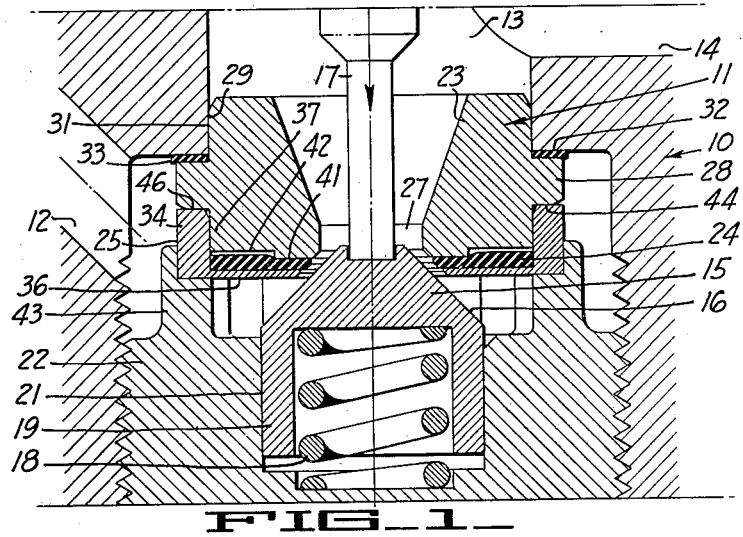
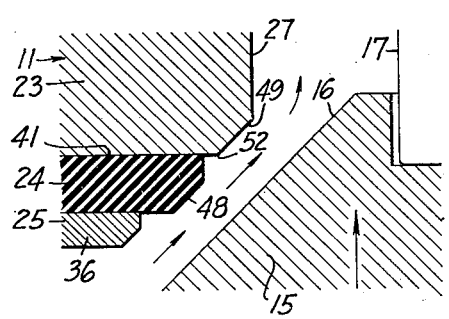
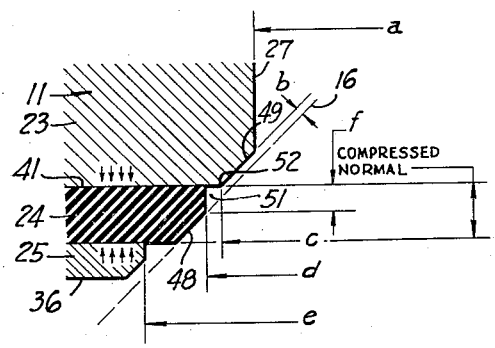
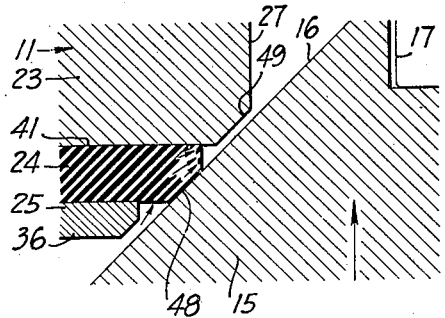
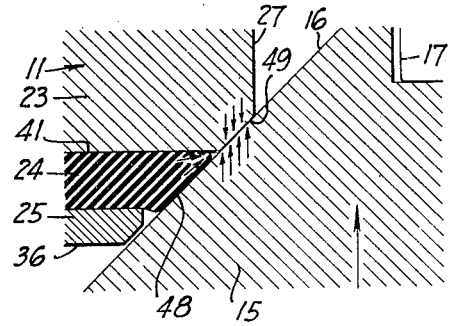
INVENTOR
Thomas E. Gannon
BY
Paul O. Feiler
ATTORNEY Patented Oct. 18, 1949

2,485,092

UNITED STATES PATENT OFFICE 2,485,092

VALVE CONSTRUCTION

Thomas E. Gannon, Oakland, Calif., assignor, by mesne assignments, to Fluid Control Engineering Co., Emeryville, Calif., a copartnership Application May 20, 1944, Serial No. 536,556

1 Claim. (Cl. 251—167)

This invention relates generally to the construction of valves of the type making use of a valve member movable in opposite directions between open and closed positions and having a conical shaped working surface cooperating with a stationary valve seat.

In conventional designs for valves of the above type various materials are employed for forming the valve working surfaces, depending upon the type of service and valve characteristics desired. For example with valves designed to handle relatively low pressure differentials, one of the valve surfaces may be formed of resilient material such as natural or synthetic rubber, with the other surface formed of some suitable rigid material such as a suitable steel or steel alloy. Use of resilient material in this fashion has not been considered practical for relatively high pressure differentials, because the forces and flow rates encountered will either rapidly deteriorate the resilient material, or cause immediate failure. Therefore it is generally accepted that rigid materials, particularly metals, should be used for high pressure differentials. The primary difficulty involved in use of metals for forming the valve surfaces is that the surfaces must be very carefully machined, and the parts must be in accurate alignment to provide a tight seal in closed position. These requirements add considerably to cost of manufacture. In addition hard metal valve working surfaces tend to leak when the fluid being handled contains small particles of foreign material, because even small particles adhering to the valve surfaces prevent proper sealing engagement. Although screens or filters are frequently used, it is difficult to remove foreign material to such an extent as to preclude all possibility of leakage due to foreign material.

It is an object of the present invention to provide a valve construction which makes use of resilient material to form a valve surface for tight sealing, and which at the same time is capable of withstanding relatively high pressure differentials without deterioration or failure of the resilient material.

A further object of the present invention is to provide a valve construction capable of producing a tight shut-off in closed position irrespective of presence of small foreign particles on the valve surfaces.

Additional objects of the invention will appear from the following description in which the preferred embodiment has been set forth in detail in conjunction with the accompanying drawing.

Referring to the drawings:

Figure 1 is a side elevational detail in cross section, illustrating a valve construction incorporating the present invention.

Figure 2 is an enlarged cross sectional detail showing a portion of the valve seat.

Figure 3 is an enlarged cross-sectional detail illustrating the relationship between the stationary and moving parts of the valve, when the valve member is in open or partially open position.

Figure 4 is a view similar to Figure 3, but showing the movable valve member being moved to closed position.

Figure 5 is a view similar to Figure 3, but showing the movable valve member in fully closed position.

The embodiment of the invention illustrated in the drawing consists generally of a body 10 within which is mounted the stationary seat assembly 11. Only a portion of the body has been illustrated because it may be from any one of a number of fluid control devices, as for example the body of a manual or motor operated valve, or of a regulating device capable of handling relatively high pressures, as for example a high pressure regulator of the type disclosed in Grove Patent No. 2,047,101. Assuming that the body is a part of such a high pressure regulator, port 12 represents an inlet duct communicating with the general inlet passage of the device, while space 13 is on the outlet side and is connected to the outlet passage 14. Movable valve member 15 cooperates with the seat assembly and is provided with a conical shaped valve working surface 16. The slope of this surface may vary but good results are secured when it is formed on an angle of about 45°.

The valve member is made of suitable rigid material, as for example a steel or steel alloy. Suitable means for operating the valve member 15 is represented by the thrust rod 17, which in turn may for example connect with a fluid operated diaphragm. Compression spring 18 urges the valve member 15 against rod 17. For guiding the valve member and to maintain proper alignment with the stationary seat assembly, it is shown provided with a cylindrically shaped portion 19, which operatively fits within the bore 21 formed in the closure plug 22.

The stationary seat assembly 11 preferably includes three parts, namely the ring shaped body portion 23, the disc 24 of resilient material such as natural or synthetic rubber, and the annular retainer 25.

The ring 23 is formed of suitable rigid material such as a steel or steel alloy, and it has a central opening or orifice 27 through which fluid flow occurs when the valve member is in open position. The exterior of this ring is machined to provide the annular rib 28 which facilitates retention of the seat assembly within the body in proper alignment with the valve member. The peripheral surface 29 of the ring is machined to snugly fit the cylindrical bore 31 in the body. Likewise the body is provided with a flat annular machined shoulder 32, against which the rib 28 is clamped. A gasket 33 insures a proper seal against leakage.

The retainer 25 includes a ring shaped flange portion 34, and a flat end wall 36 which underlies the resilient disc 24. The peripheral surface 37 of the ring 23, below the rib 28, is machined to such dimensions that the ring portion 34 fits snugly over the same.

The disc 24 of resilient material is dimensioned whereby its outer diameter is equal to the inner diameter of the ring portion 34. Thus engagement of its outer peripheral edge with the inner periphery of ring portion 34 properly aligns this disc with the center of the seat assembly. The lower end or side of the ring 23, or in other words that side faced toward the inlet side of the valve, is machined to provide two concentric faces 41 and 42, with the face 42 offset upwardly with respect to face 41. As will be presently explained the purpose of this is to enable a predetermined amount of pressure to be placed upon the inner peripheral edge portion of the resilient disc.

The seat assembly is normally held together by the clamping action of the closure 22. As illustrated this closure has a threaded engagement with the body. Its upper or inner end is provided with a plurality of circumferentially spaced lugs 43, which are machined to engage the retainer 25 as illustrated. By turning the closure 22 pressure can be applied to force the rib 28 in tight engagement with the body, and at the same time to force the annular face 44 of the retainer 25 into tight abutment with the lower annular face 46, formed by the rib 28. When the seat assembly is clamped in this manner the inner peripheral edge portion of the resilient disc 24 is compressed a predetermined amount between the wall 36 and the annular face 41. However the remainder of the disc is uncompressed, because of the dimensioning of the face 42 and the opposed face of wall 36.

The inner peripheral edge of the resilient disc 24 is shaped in a manner which can be best understood by reference to Figures 2 to 5 inclusive. Thus instead of providing a sharp or feathered edge, it is provided with a conical shaped portion 48, whereby this surface is coincident with a cone aligned with the axis of valve member 15, and formed on the same angle as the conical surface 16. The adjacent edge of the body ring 23 is likewise machined to form the conical shaped surface 49, but as indicated in the drawing by dimension b, surface 49 is offset a small amount with respect to surface 48.

The length of surface 49 is considerably less than the compressed thickness of the disc 24, whereby an annular space or recess 51 is provided between the disc and the metal surface 49. As will be presently explained this space is of importance in that it prevents a pinching action of the disc.

The wall 36 of the retainer ring 25 is simply formed to properly retain the resilient disc in the manner described, without interfering in any way with cooperation of surfaces 48 and 49 with the surface 16 of the valve member. Thus the opening in wall 36 should be dimensioned whereby this wall at no time can be brought into contact with the valve surface 16.

Figure 3 illustrates the relationship between the stationary seat assembly and the movable valve member, for open position of the valve. It will be noted that the resilient disc 24 does not interfere with proper flow between the valve parts.

Figure 4 illustrates the valve member 15 approaching final closed position. Its conical surface 16 has been brought into physical contact with the conical surface 48 of the resilient material. Assuming that the pressure differential is not high such a light physical contact may be sufficient to stop fluid flow. However, for considerable pressure differentials the valve member takes the position shown in Figure 5, with its conical metal surface 16 in abutting engagement with the conical surface 49. In moving between the positions of Figures 4 and 5 the inner peripheral edge portion of the resilient disc is compressed somewhat without detrimental crushing, and it will be noted that in the course of this compression a certain amount of the resilient material is forced into the recess 51. However a small space still exists, and therefore there is no danger of pinching the rubber over the adjacent edge 52. The squeezing action of the resilient material into the recess 51 affords a perfect seal against the inflow pressure, particularly because the inflow pressure likewise tends to force the inner peripheral portion of the disc into recess 51. Relatively heavy forces which may be applied upon the valve member, due for example to high differential pressures, can cause no injury whatsoever to the resilient surface 48, because all of such heavy forces are taken by the abutment between the metal surfaces 16 and 49.

While a relatively small amount of compression of the resilient disc takes place when the valve member moves to fully closed position, foreign particles have little if any effect upon maintaining a proper seal. Small particles if they should lodge between surfaces 16 and 49, will not cause such a separation as to prevent a proper seal between surface 16 and the resilient surface 48. Likewise foreign particles lodging between surfaces 16 and 48 will not interfere with a proper seal, because of the resilient character of the surface 48.

Suitable dimensions can be specified by way of example, for one type and size of valve, as follows: The valve in which the invention was applied was a high pressure regulator of the type disclosed in Patent No. 2,047,101, adapted to handle inlet pressures ranging up to several thousand pounds per square inch. The resilient disc was made from a high grade buna rubber, such as Hycar, and before compression measured 0.028 of an inch. The inner peripheral edge portion was compressed to 0.022 of an inch. Dimension $a$ on Figure 2, that is the size of orifice 27, was $\frac{3}{16}$ of an inch. It should be understood that both smaller and larger orifice diameters can be employed. Dimension $b$ on Figure 2, that is the offset between the resilient and metal surfaces 48 and 49, measured about 0.006 of an inch. Dimension $c$, that is the diameter to the edge 52, amounted to 0.028 of an inch plus the orifice diameter. Dimension $d$, that is the smallest diameter of the resilient disc 24, measured 0.052 of an inch plus the orifice diameter. Dimension $e$, that is the smallest diameter of the wall 36, measured about 0.109 of an inch plus the orifice diameter. Dimension $f$, that is the height of the recess 51, measured about 0.012 of an inch after being compressed. Therefore the height of this recess was of the order of about one half the compressed thickness of the resilient disc.

It is understood that the foregoing example is given to facilitate practicing the invention, and not by way of limitation. As previously stated it is desirable for the resilient disc to be relatively thin, because a thin disc can be held more firmly with a small amount of compression. In general it can be stated that the disc should have a thickness which is a minor fraction of the width of face 41. The offset $b$ should likewise be a relatively small dimension in comparison with the compressed thickness of the disc. In the foregoing example this ratio is about 1 to 4, and in general it should likewise be a minor fraction.

Features of the invention are applicable to a wide variety of valves and fluid flow control devices, in addition to pressure reducing regulators, as for example motor operated valves and valves operated manually.

I claim:

In a valve construction of the type making use of a valve member having a conical valve working surface and movable in opposite directions to control fluid flow, an annular valve seat assembly having an annular fluid passage or orifice, said seat assembly comprising a rigid ring shaped body surrounding the passage and having a conical seating surface for abutment with the conical surface of the valve member, said seating surface being faced toward the valve member and toward the inflow side of the valve, a relatively thin disc of resilient material disposed upon the inflow side of the body, a retainer cap telescopically engaging the body on the inflow side of the same and having a wall extending over the disc, the disc having a central opening concentric with the axis of the seat assembly and the inner periphery of the disc being adapted to contact and seal upon the conical surface of the valve member when the valve member is in abutment with the conical surface of the body member, the outer periphery of the disc engaging the inner periphery of the cap rim to centralize the disc, and means serving to clamp the retainer cap upon the ring shaped body, the body and the retainer cap being formed whereby when so clamped the inner peripheral edge portion of the resilient disc is compressed while the remainder of the disc is uncompressed.

THOMAS E. GANNON.

REFERENCES CITED

The following references are of record in the file of this patent:

UNITED STATES PATENTS

| Number | Name | Date |
|---|---|---|
| 874,652 | Bailey | Dec. 24, 1907 |
| 2,060,748 | Roberts | Nov. 10, 1936 |
| 2,107,200 | Kennon | Feb. 1, 1938 |
| 2,110,825 | Archer | Mar. 8, 1938 |
| 2,163,472 | Shimer | June 20, 1939 |
| 2,260,381 | Kennon | Oct. 28, 1941 |
| 2,293,068 | McLaughlin | Aug. 18, 1942 |

FOREIGN PATENTS

| Number | Country | Date |
|---|---|---|
| 9,164 | Great Britain | 1915 |
| 12,911 | Great Britain | 1904 |
| 203,825 | Great Britain | 1923 |